United States Patent
Kataho et al.

(10) Patent No.: US 7,964,135 B2
(45) Date of Patent: Jun. 21, 2011

(54) METHOD AND APPARATUS FOR IMPRINTING ENERGY RAY-SETTING RESIN, AND DISCS AND SEMICONDUCTOR DEVICES WITH IMPRINTED RESIN LAYER

(75) Inventors: Hideaki Kataho, Kanagawa (JP); Hiroshi Okada, Kanagawa (JP); Kenya Wada, Tokyo (JP); Hisayoshi Ichikawa, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/719,890

(22) Filed: Mar. 9, 2010

(65) Prior Publication Data

US 2010/0156006 A1    Jun. 24, 2010

Related U.S. Application Data

(62) Division of application No. 11/780,077, filed on Jul. 19, 2007, now abandoned.

(30) Foreign Application Priority Data

Jul. 21, 2006   (JP) .................. 2006-199578

(51) Int. Cl.
   *H01J 37/30* (2006.01)
(52) U.S. Cl. .................. 264/485; 264/496; 977/887
(58) Field of Classification Search .................. 264/496, 264/485; 977/887
   See application file for complete search history.

(56) References Cited

U.S. PATENT DOCUMENTS

| | | | | |
|---|---|---|---|---|
| 6,932,934 | B2 * | 8/2005 | Choi et al. | 264/496 |
| 7,303,703 | B2 | 12/2007 | Hocheng et al. | |
| 7,354,698 | B2 * | 4/2008 | Van Santen et al. | 430/311 |
| 7,465,162 | B2 | 12/2008 | Kokubo et al. | |
| 2004/0013982 | A1 * | 1/2004 | Jacobson et al. | 430/320 |
| 2006/0280829 | A1 | 12/2006 | Kruijt-Stegeman | |
| 2007/0176320 | A1 | 8/2007 | Nakamura | |

FOREIGN PATENT DOCUMENTS

JP   2002-251801   9/2002

* cited by examiner

*Primary Examiner* — Robert B Davis
*Assistant Examiner* — David N Brown, II
(74) *Attorney, Agent, or Firm* — Antonelli, Terry, Stout & Kraus, LLP.

(57) ABSTRACT

Disclosed herein is a method for transferring a pattern of minute dents and projections to an energy ray-setting resin layer coated on a substrate plate by pressing a master pattern on a transfer mold, followed by irradiation of energy rays. The pattern transfer method comprises the steps of pressing a master pattern on a transfer mold against the resin layer under a predetermined imprinting pressure, irradiating the resin layer under the imprinting pressure with energy rays, interrupting the irradiation of energy rays and at the same time cancelling application of the imprinting pressure and holding the resin layer and the transfer mold in a non-pressed state to relieve the resin layer of internal stresses, and recommencing irradiation of the resin layer with energy rays to complete hardening of the resin layer which is held in contact with the transfer mold in a non-pressed state.

3 Claims, 3 Drawing Sheets

METHOD AND APPARATUS FOR IMPRINTING ENERGY RAY-SETTING RESIN, AND DISCS AND SEMICONDUCTOR DEVICES WITH IMPRINTED RESIN LAYER

CROSS-REFERENCE TO RELATED APPLICATION

This application is a divisional application of U.S. application Ser. No. 11/780,077, filed Jul. 19, 2007 and now abandoned, the contents of which are incorporated herein by reference.

BACKGROUND OF THE INVENTION

1. Field of the Art

This invention relates to a method and an apparatus for transferring a pattern of infinitesimally minute structures in the form of dents and projections onto an energy ray-setting resin layer coated on a substrate plate, by pressing a master pattern on a pattern transfer mold against the energy beam-setting resin, and also to data storage discs and semiconductor devices with a resin layer imprinted with a pattern of minute structures.

2. Prior Art

Nano-pattern imprinting technology has been applied in various fields, for example, in the fields of electronics such as semiconductors, storage media, optical or other devices and also in the fields of information technology and biotechnology in connection with cell culture sheets. As known in the art, in nano-pattern imprinting, a pattern transfer mold, with a master pattern of infinitesimally minute structures, is pressed against a thin synthetic resin film layer coated on a substrate plate or sheet to transfer and imprint the pattern on the resin film. The transferring pattern can be a pattern of nano-structures of a linear shape or of a pillar-like shape.

Normally, a thermo-setting resin or an energy ray-setting resin is used for the synthetic resin layer to be imprinted with a nano-pattern. Of photo-setting resins typical of the energy ray-setting resins, ultraviolet curing resins such as urethane resins and epoxy resins are in wide use because of their fast-curing merit. A resin in a softened state is uniformly coated on a surface of a substrate, and a master pattern is pressed on the surface of the coated resin layer to transfer and imprint profiles of nano-structures of the master pattern, followed by irradiation of ultraviolet rays through the transfer mold or through the substrate plate to cure the imprinted resin layer. A pattern transfer mold which is made of an ultraviolet-transmitting material like quartz glass is used in a case where ultraviolet ray is irradiated through the transfer mold. Normally, a master pattern consisting of infinitesimally minute dents and projections is prepared on a transfer surface of the mold by a lithographic process.

The so-called stamping process is well known as a technology for transferring a pattern of minute dents and projections to an ultraviolet curing resin, and has been employed in the manufacture of optical discs (DVDs) and recording media in the shape of a disc. For example, as described in Japanese Laid-Open Patent Application 2002-251801, a stamper with a master pattern is set on a lower mold, face to face with a film which is supported on a transparent support body through a handling member, and an ultraviolet curing resin is fed onto the stamper and pressed the resin between the stamper and the film, followed by irradiation of ultraviolet rays to cure the pressed resin.

In this regard, a pattern can be transferred and imprinted with a satisfactory quality as long as the pattern to be transferred is low in aspect ratio, i.e., a difference in height between top and bottom, as in the case of the DVD pattern described in Japanese Laid-Open Patent Application 2002-251801. However, in nano-pattern imprinting, it is often required to transfer dents and projections which are smaller in size and higher in aspect ratio. For example, it becomes necessary to transfer a nano-pattern consisting of cylindrical or conical pillars which are several tens to several hundreds nanometers in diameter and have a high aspect ratio which is several tens times as large as the diameter. However, from the standpoint of accuracy and yield of pattern transfer, it is difficult to apply the DVD pattern transfer technology, as described in Japanese Laid-Open Patent Application 2002-251801, to transfer of nano-patterns having a higher aspect ratio.

SUMMARY OF THE INVENTION

In view of the situations as discussed above, it is an object of the present invention to a method and an apparatus for impring a resin with nano-structures of a high aspect ratio with high accuracy.

In accordance with the present invention, in order to achieve the above-stated objective, there is provided a method for transferring a pattern of minute dents and projections to an energy ray-setting resin layer coated on a substrate plate by pressing a master pattern on a transfer mold, followed by irradiation with energy rays, characterized in that the method comprises the steps of: pressing said transfer mold against the resin layer by application of a predetermined imprinting pressure in a pattern imprinting stage to imprint profiles of the minute dents and projections of the master pattern on the resin layer; hardening the resin layer in a following first hardening stage, irradiating energy rays toward the resin layer which is still in pressed contact with the transfer mold under the imprinting pressure; interrupting irradiation of energy rays of hardening of the resin layer halfway in an interrupting stress relieving stage, holding the transfer mold in a non-pressed state to relieve internal stresses; and recommencing irradiation of energy rays to complete hardening of the resin layer in a second hardening stage, holding the transfer mold in contact with resin layer in a non-pressed state.

Typical of nano-pattern imprinting methods is a method of imprinting a photo-setting resin with a nano-pattern, i.e., a pattern of nano-structures. In this regard, it has been the general practice to use ultraviolet rays as energy rays, and therefore various ultraviolet curing resins have been in use for this purpose. In a photo-setting nano-pattern imprinting process, a master pattern on a transfer mold, which consists of a multitude of nano-structures, is pressed on a viscous molten resin layer under a predetermined pressure in a pattern imprinting stage to transfer the nano-pattern onto the resin layer, followed by irradiation of energy rays like ultraviolet rays, for example, to induce hardening crosslinking reactions in the resin layer. At this time, heat is generated as a result of crosslinking reactions, so that it is probable that internal stresses remain in the resin layer if the imprinting pressure is continuously applied thereon. Such internal stresses may cause fractures or damages to the nano-structures at the time of separating the transfer mold. In order to relieve the resin layer of internal stresses, irradiation of energy rays is interrupted halfway of hardening of the resin layer, at the same time cancelling application of the imprinting pressure. However, in order to maintain profiles of nano-structures of the master pattern precisely, the resin layer is left in contact with the transfer mold in a non-pressed state. Thus, the resin layer can be relieved of residual internal stresses without impairing the performance quality of the transfer mold. That is to say, in the first hardening stage, the resin layer is hardened to a halfway point, to a semi-hardened point where it can retain imprinted profiles in a stabilized state unless an external force is applied. Since the imprinted profiles stabilize until the end of the first hardening stage, no pressure is applied to the resin layer by the transfer mold in the following stages, including the interrupting stress relieving stage. After the interrupting stress relieving stage, irradiation of energy rays is recommenced and continued to let the resin layer harden completely. After complete hardening of the resin layer, the transfer mold can be separated very smoothly even in a case where imprinted nano-structures are of a high aspect ratio, guaranteeing high transfer accuracy without causing fractures or damages to imprinted structures.

Further, according to the present invention, there is provided an apparatus for transferring profiles of minute dents and projections of a master pattern on a transfer surface of a mold onto an energy ray-setting resin layer coated on a substrate plate by pressing the mold on the resin layer, the apparatus comprising: a pattern imprinting means, including a substrate positioning member adapted to hold the substrate plate fixedly in position, a mold holder member adapted to hold said transfer mold fixedly thereon, facing a master pattern on the transfer surface of the mold toward the energy ray-setting resin layer of the substrate plate on the substrate positioning member, and a pressing means adapted to move the substrate positioning member and the mold holder member relatively toward each other to apply an imprinting pressure thereto; an energy ray irradiation means so positioned as to irradiate the resin layer with energy rays at the time of hardening same; and a control means adapted to control operations of the pattern imprinting means and the energy ray irradiation means in each pattern transfer cycle of actuating the pressing means to press said transfer mold and said resin layer to each other with a predetermined imprinting pressure to transfer minute dents and projections of the master pattern onto the resin layer, irradiating the resin layer with energy rays from the energy ray irradiation means, interrupting irradiation with energy rays halfway of hardening as soon as the resin layer reaches a semi-hardened state and at the same time cancelling application of the imprinting pressure and leaving the resin layer and transfer mold in a non-pressed state for relief of internal stresses of the resin layer, and recommencing irradiation of the resin layer with energy rays in the non-pressed state to complete hardening of the resin layer.

Thus, according to the present invention, it becomes possible to imprint an energy ray-setting resin with nano-structures of a high aspect ratio accurately without causing fractures or damages to imprinted nano-structures.

The above and other objects, features and advantages of the invention will become apparent from the following particular description of the invention, taken in conjunction with the accompanying drawings which show by way of example preferred embodiments of the invention. Needless to say, it is to be understood that the present invention is not limited to particular forms shown in the drawings.

DESCRIPTION OF PREFERRED EMBODIMENTS

Figure 1:
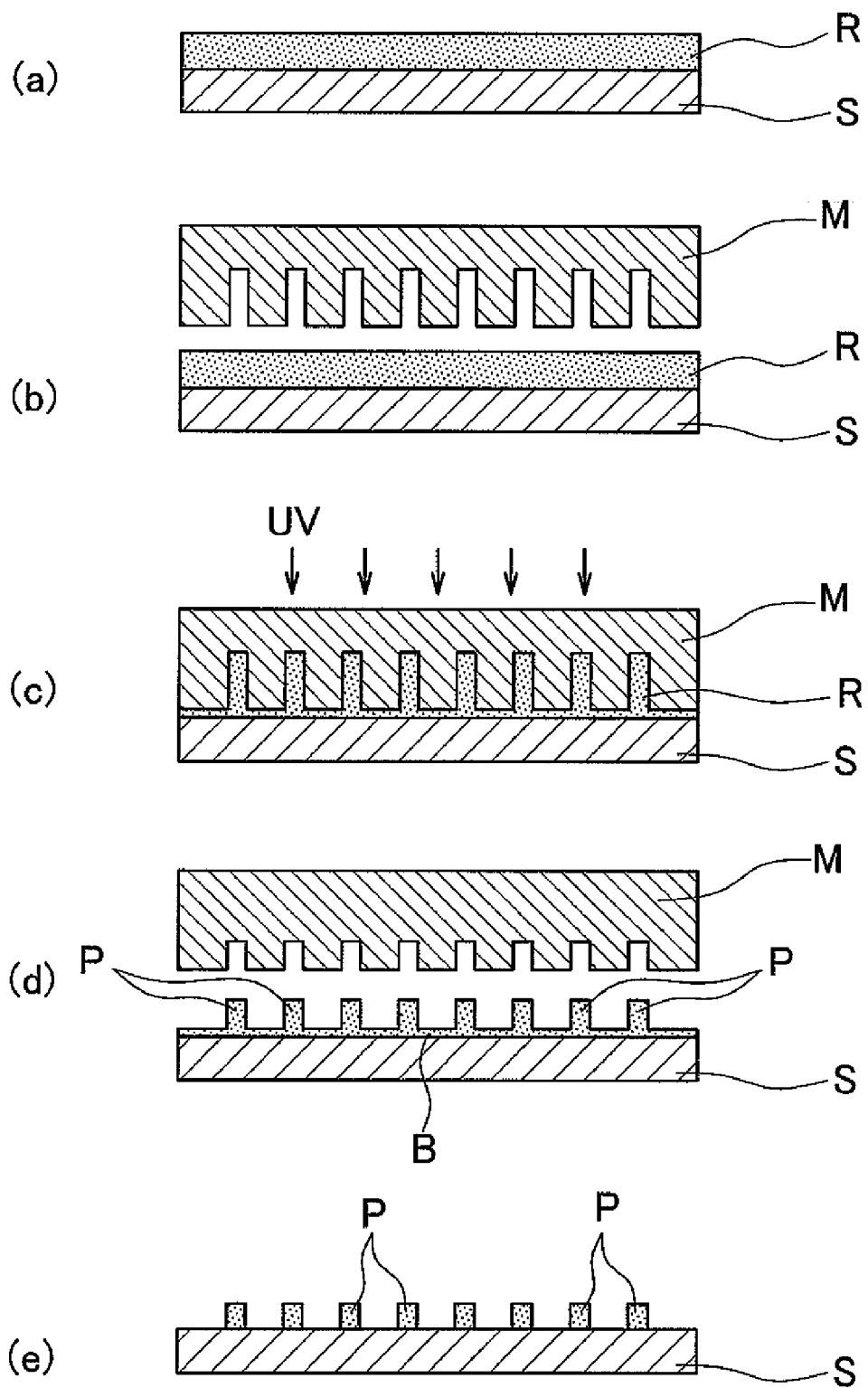
FIG. 1 a diagrammatic illustration showing steps of a photo-setting nano-pattern imprinting process on a coated photo-setting resin layer.

Hereafter, the present invention is described more particularly by way of its preferred embodiments, with reference to the accompanying drawings. Schematically shown in FIG. 1 are steps of a photo-setting nano-pattern transfer process, as an example of pattern transfer to an energy ray-setting resin by the use of a pattern transfer mold. As shown at (a) of FIG. 1, an ultraviolet curing resin R is coated on a surface of a substrate plate S. In this instance, the coated resin layer R is maintained in a liquid state having a predetermined viscosity. Then, as shown at (b) of the same figure, a transfer mold M is pressed against the resin layer R to transfer profiles of a master pattern on a transfer surface of the mold M onto the resin layer R. In the next place, as shown at (c) of the same figure, the resin layer R is cured by irradiation of ultraviolet rays. As soon as the resin layer R is hardened, the transfer mold M is separated from the substrate plate S which is now imprinted with projections P of the transferred pattern on its surface as shown at (d). In this state, however, a base layer B still remains on the surface of the substrate plate S, so that the base layer B needs to be removed by immersion in a predetermined solution as shown at (e).

In this instance, imprinted projections P are each in a pillar-like shape or in a linear shape and, for example, have an aspect ratio of 1:10 (a ratio of height to width). Besides, the imprinted projections P are as minute as several tens to several hundreds nanometers. Such nano-structure projections P which are extremely thin as compared with their height can be transferred by the use of a transfer mold accurately free of damages, and by adoption of a method as described below.

Figure 2:
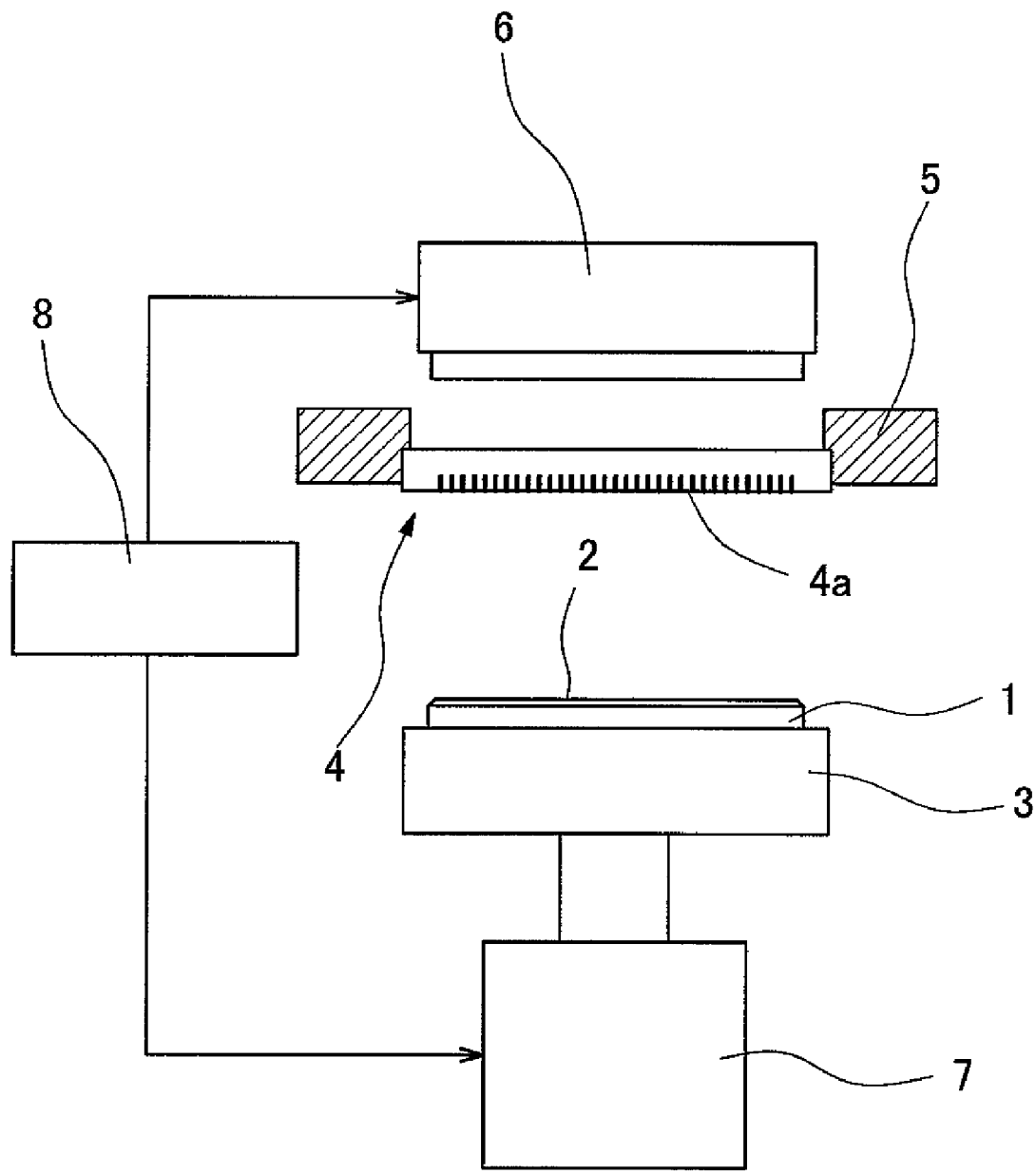
FIG. 2 a diagrammatic illustration of a photo-setting nano-pattern imprinting apparatus according to the invention.

Referring to FIG. 2, there is schematically shown a photo-setting nano-pattern imprinting apparatus which is adopted to carry out a nano-pattern transfer method according to the invention. In that figure, shown at 1 is a substrate plate which is, for example, a glass substrate plate. A resin layer 2 of an ultraviolet curing resin is coated in uniform thickness on a surface of the glass substrate plate 1. The substrate plate 1 is set in a predetermined position on a substrate positioning member 3, and fixed in position by vacuum force or by other suitable fixation means. Positioned over the substrate plate 1 is a pattern transfer mold 4 which is made of a material with satisfactory properties in transparency and energy ray transmittance, especially satisfactory in ultraviolet transmittance like quartz glass. On a pattern transfer surface 4a which is disposed face to face with the substrate plate 1, the pattern transfer mold 4 is provided with a master pattern of nano-structures, which are prepared, for example, by lithography, for transfer to the resin layer 2 of the substrate plate 1. In a case where the resin layer 2 is cured by irradiation of energy rays like electron rays, of course, the pattern transfer mold is made of a material which can transmit electron rays efficiently.

The pattern transfer mold 4 is fixedly retained on a mold holder 5, and an ultraviolet irradiation unit 6 is located over the transfer mold 4 on the mold holder 5 to irradiate the resin layer 2 with ultraviolet rays through the transfer mold 4. Toward and against the transfer mold 4 which is fixedly retained on the molder holder 6, the substrate plate 1 is pushed up by the positioning member 3 to transfer profiles of the master pattern on the transfer surface 4a onto the resin layer 2. The substrate positioning member 3 is mounted on a pressing lift means 7 such as a jack, cylinder, feed screw or the like which is capable of lifting the positioning member 3 up and down and pressing the resin layer 2 against the transfer mold 4 under a controlled imprinting pressure. Thus, a pattern transfer stage is constituted by the substrate positioning member 3 on which a substrate plate 1 is set, along with the pattern transfer mold 4, mold holder 5 and pressing lift means 7. In addition, in the patter transfer stage, an ultraviolet irradiation unit 6 is located above the transfer mold 4 for irradiation of ultraviolet rays.

Figure 3:
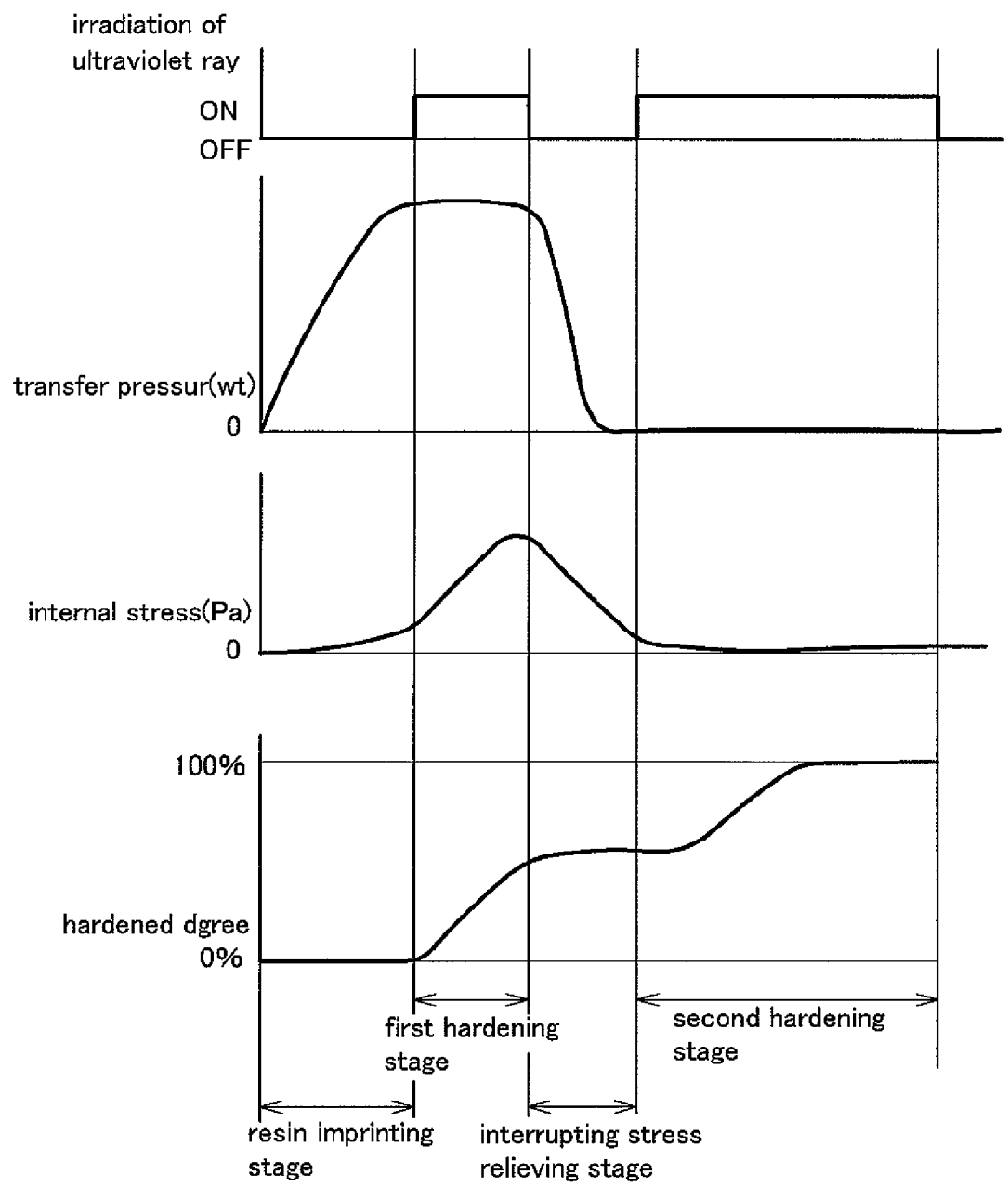
FIG. 3 is a timing chart for transferring a master pattern on a transfer mold onto a resin layer coated on a substrate plate, by the use of the imprinting apparatus of FIG. 2.

The photo-setting nano-pattern transfer apparatus of the above-described arrangement is further provided with an electric control circuit 8 thereby to control operations of the respective components of the pattern transfer stage, especially, operations of the pressing lift means 7 and ultraviolet irradiation unit 6 in transferring profiles of nano-structures on the transfer surface 4a of the mold 4 onto the resin layer 2 which is coated on the substrate plate 1. Described below is a method for controlling transfer of minute structures of a master pattern on the transfer surface 4a of the mold 4 to the resin layer 2 by means of the control circuit 8, with reference to the timing chart of FIG. 3.

In the first place, by the use of a suitable handling means, a substrate plate 1 having a resin layer 2 of a predetermined thickness coated on its surface is set in position on the positioning member 3 which is now at a lowered position. As soon as the substrate plate 1 is set in position, the pressing lift means 7 is actuated to push up the positioning member 3, bringing the coated resin layer 2 on the surface of the substrate plate 1 into pressed contact with the transfer surface 4a of the mold 4 under a predetermined transfer imprinting pressure (wt). In this resin imprinting stage, the transfer pressure (wt) is determined in relation with the viscosity of the coated resin layer 2 such that profiles of nano-structures of the master pattern on the transfer surface 4a of the mold 4 can be accurately transferred to the resin layer 2.

As soon as profiles of the master pattern on the transfer surface 4a of the mold 4 are accurately transferred to the resin layer 2 in the pattern imprinting stage as described above, the ultraviolet irradiation unit 6 is turned on to irradiate the imprinted resin layer 2, which is still held under the imprinting pressure (wt), with ultraviolet rays through the transfer mold 4, inducing crosslinking reactions in the imprinted resin layer to harden same. This is a first hardening stage. In this first hardening stage, the resin layer 2 is expanded as a result of heat generation, giving rise to an internal stresses (Pa) within the resin layer which is held in a confined state by the transfer mold 4. The higher the degree of hardening of the resin becomes the greater the internal stresses of the resin layer 2. Therefore, in the first hardening stage, the resin is not irradiated with ultraviolet rays until it is completely hardened. That is to say, the ultraviolet irradiation unit 6 is turned off at a halfway point of hardening at which the imprinted resin layer 2 reaches a semi-hardened state, temporarily suspending ultraviolet irradiation and at the same time cancelling application of the imprinting pressure by the pressing lift member 7 to relieve internal stresses. Even after cancellation of the pressing force on the resin layer 2 and the transfer mold 4, however, the resin layer 2 is left in contact with the transfer surface 4a of the mold 4 in a non-pressed state to keep imprinted profiles in a restricted state. This stage is called an intervening stress relieving stage.

In this regard, it is desirable to interrupt the hardening of the resin at a time point when the resin has been hardened to a degree approximately between 40% and 60%. Hardening of the resin still progresses to some extent even after interruption of the irradiation of ultraviolet rays by the ultraviolet irradiation unit 6. The resin layer 2 is relieved of internal stresses upon cancellation of application of an imprinting pressure. After relieving the resin layer 2 of internal stresses almost entirely, the ultraviolet irradiation unit 6 is turned on again to start a second hardening stage, irradiating the resin layer 2 with ultraviolet rays once again, letting crosslinking reactions to proceed further for hardening the resin layer 2 completely 100%. At this time, no internal stresses occur within the resin layer 2 because no imprinting pressure is applied thereon in this second hardening stage. Nevertheless, accuracy of pattern transfer is guaranteed by the transfer mold 4 which holds imprinted profiles on the resin layer 2 in a restricted state throughout the second hardening stage.

After imprinting a nano-pattern on the substrate plate 1 in the manner as described above, the transfer mold 4 is separated from the resin layer 2. Since the resin layer 2 has been relieved of internal stresses, despite a high aspect ratio, nano-structures which are imprinted on the resin layer 2 are less likely to get broken or damaged at the time of separation of the mold. Thus, by adoption of the transfer method as described above, it becomes possible to imprint nano-structures of a high aspect ratio with extremely high accuracy and at an improved yield.

What is claimed is:

1. A method for transferring a pattern of minute dents and projections to an energy ray-setting resin layer coated on a substrate plate by pressing a master pattern on a transfer mold, followed by irradiation with energy rays, characterized in that said method comprises the steps of:

pressing said transfer mold against said resin layer by application of a predetermined imprinting pressure in a pattern imprinting stage to imprint profiles of minute dents and projections of said master pattern on said resin layer;

hardening said resin layer in a first hardening stage, irradiating energy rays toward said resin layer which is still in pressed contact with said transfer mold under said imprinting pressure;

temporarily interrupting irradiation of energy rays of hardening of said resin layer halfway in an interrupting stress relieving stage, holding said transfer mold in a non-pressed state to relieve internal stresses of said resin layer; and recommencing irradiation of energy rays to complete hardening of said resin layer in a second hardening stage, holding said transfer mold in contact with said resin layer in a non-pressed state.

2. A method as defined in claim 1, wherein said energy ray-setting resin is an ultraviolet-setting resin.

3. A method as defined in claim 1, wherein said energy ray-setting resin is an electron ray-setting resin.

* * * * *